US012793414B2

(12) United States Patent
Latapie et al.

(10) Patent No.: US 12,793,414 B2
(45) Date of Patent: Nov. 10, 2026

(54) AUTOMATIC METAMODEL GENERATION FOR ARTIFICIAL INTELLIGENCE REASONING

(71) Applicant: Cisco Technology, Inc., San Jose, CA (US)

(72) Inventors: Hugo Latapie, Long Beach, CA (US); Gaowen Liu, Austin, TX (US); Ozkan Kilic, Long Beach, CA (US); Adam James Lawrence, Pasadena, CA (US); Ramana Rao V. R. Kompella, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 364 days.

(21) Appl. No.: 18/086,886

(22) Filed: Dec. 22, 2022

(65) Prior Publication Data

US 2024/0212348 A1 Jun. 27, 2024

(51) Int. Cl.

| | |
|---|---|
| ***G06V 20/40*** | (2022.01) |
| ***G06F 40/30*** | (2020.01) |
| ***G06V 10/774*** | (2022.01) |
| ***G06V 10/82*** | (2022.01) |
| ***G06V 20/52*** | (2022.01) |
| ***G06V 20/70*** | (2022.01) |

(52) U.S. Cl.

CPC .............. *G06V 20/41* (2022.01); *G06F 40/30* (2020.01); *G06V 10/774* (2022.01); *G06V 10/82* (2022.01); *G06V 20/52* (2022.01); *G06V 20/70* (2022.01)

(58) Field of Classification Search

CPC ........ G06V 20/41; G06V 20/70; G06V 20/52; G06V 10/82; G06V 10/774; G06F 40/30

See application file for complete search history.

(56) References Cited

U.S. PATENT DOCUMENTS

| | | | | |
|---|---|---|---|---|
| 5,970,482 | A * | 10/1999 | Pham | G06N 3/042 706/45 |
| 8,677,377 | B2 * | 3/2014 | Cheyer | G06N 7/01 719/310 |
| 10,887,197 | B2 | 1/2021 | Fenoglio et al. | |
| 10,965,516 | B2 | 3/2021 | Fenoglio et al. | |
| 11,336,506 | B1 | 5/2022 | Li et al. | |
| 2005/0180603 | A1 | 8/2005 | Zoghlami et al. | |

(Continued)

FOREIGN PATENT DOCUMENTS

| | | |
|---|---|---|
| WO | WO-2015027289 A1 | 3/2015 |
| WO | WO-2019168323 A1 | 9/2019 |
| WO | WO-2021251062 A1 | 12/2021 |

OTHER PUBLICATIONS

Xiong, Peixi et al, TA-Student VQA: Multi-Agents Training by Self-Questioning, 2020 (Year: 2020).*

(Continued)

*Primary Examiner* — Kevin Ky

(74) *Attorney, Agent, or Firm* — Lee & Hayes, P.C.

(57) ABSTRACT

In one embodiment, a student agent identifies a topic of interest. The student agent issues a set of one or more questions to a teacher agent regarding the topic of interest. The student agent receives, from the teacher agent, answer data in response to the set of one or more questions. The student agent uses the answer data to generate a neuro-symbolic metamodel that comprises a semantic reasoner and a sub-symbolic layer.

20 Claims, 11 Drawing Sheets

(56) References Cited

U.S. PATENT DOCUMENTS

| | | | |
|---|---|---|---|
| 2008/0069482 A1 | 3/2008 | Komiya | |
| 2010/0322516 A1 | 12/2010 | Xu et al. | |
| 2011/0051992 A1 | 3/2011 | Cobb et al. | |
| 2012/0063641 A1 | 3/2012 | Venkatesh et al. | |
| 2013/0174116 A1 | 7/2013 | Pfeifer | |
| 2013/0191357 A1 | 7/2013 | Hanis et al. | |
| 2015/0186779 A1 | 7/2015 | Deng et al. | |
| 2016/0105617 A1 | 4/2016 | Kirkby et al. | |
| 2016/0328613 A1 | 11/2016 | Gaidon et al. | |
| 2016/0364377 A1 | 12/2016 | Krishnamurthy | |
| 2019/0306011 A1* | 10/2019 | Fenoglio | H04L 41/142 |
| 2019/0325259 A1 | 10/2019 | Murphy | |
| 2019/0377824 A1 | 12/2019 | Wang et al. | |
| 2020/0251091 A1 | 8/2020 | Zhao | |
| 2020/0319715 A1 | 10/2020 | Holz | |
| 2020/0334008 A1 | 10/2020 | Spector et al. | |
| 2020/0349390 A1 | 11/2020 | Konwar et al. | |
| 2021/0042532 A1* | 2/2021 | Latapie | G06V 40/10 |
| 2021/0174155 A1 | 6/2021 | Smith et al. | |
| 2021/0225409 A1 | 7/2021 | Lawlor | |
| 2021/0256966 A1* | 8/2021 | Chatterjee | G06N 3/0455 |
| 2021/0258652 A1 | 8/2021 | Li et al. | |
| 2021/0279615 A1 | 9/2021 | Latapie et al. | |
| 2021/0312773 A1 | 10/2021 | Debnath et al. | |
| 2021/0390423 A1* | 12/2021 | Latapie | G06F 18/21 |
| 2021/0397849 A1 | 12/2021 | Lin et al. | |
| 2022/0138509 A1 | 5/2022 | Crosby et al. | |
| 2022/0156520 A1 | 5/2022 | Brower | |
| 2022/0157054 A1 | 5/2022 | Lin et al. | |
| 2024/0112044 A1* | 4/2024 | Kim | G06N 5/022 |
| 2024/0112473 A1* | 4/2024 | Ding | G06V 20/54 |
| 2024/0212348 A1* | 6/2024 | Latapie | G06V 20/52 |

OTHER PUBLICATIONS

Agrawal, et al., "VQA: Visual Question Answering", Proceedings of the IEEE International Conference on Computer Vision (ICCV), 2015, 25 pages, arXiv:1505.00468v7 [cs.CL].

Ahmed, et al., "Reflection Detection in Image Sequences", CVPR 2011, Jun./Jul. 2011, 9 pages, IEEE, Colorado Springs, CO.

Aleksander, Igor, "Machine consciousness" In Scholarpedia. 3(2):4162, Oct. 21, 2011, 7 pages.

Anderson, et al., "Bottom-Up and Top-Down Attention for Image Captioning and Visual Question Answering", 2018 IEEE/CVF Conference on Computer Vision and Pattern Recognition, Jun. 2018, pp. 6077-6086, IEEE, Salt Lake City, Utah.

Baudrillard, Jean, "Simulacra and Simulation", 1981, 159 pages, Galilee.

Baz, et al., "Context-aware hybrid classification system for fine-grained retail product recognition", 2016 IEEE 12th Image, Video, and Multidimensional Signal Processing Workshop (IVMSP), Jul. 2016, 5 pages, IEEE, Bordeaux, France.

Bělohlávek, Radim, "Concept lattices and order in fuzzy logic", Annals of Pure and Applied Logic 128 (2004) 277-298, Elsevier.

Box, G. E. P., "Science and Statistics", In Journal of the American Statistical Association, 71(356), Dec. 1976, pp. 791-799.

Chalmers, David J., "The Conscious Mind: In Search of a Fundamental Theory", 1996, 433 pages, Oxford University Press, New York.

Chella, et al., "A cognitive framework for imitation learning", Robotics and Autonomous Systems 54, Mar. 2006, pp. 403-408, Elsevier.

Chella, et al., "Artificial Consciousness", Chapter 20, In Perception-Action Cycle, 2011, pp. 637-671, Springer, New York.

Chella, et al., "Machine Consciousness: A Manifesto for Robotics", In International Journal of Machine Consciousness, 1(1), Jun. 2009, pp. 33-51, World Scientific Publishing Company.

Cohen, Paul R., "Projections as Concepts", Computer Science Department Faculty Publication Series (194), https://scholarworks.umass.edu/cs/_faculty/_pubs/194, 1997, 6 pages, University of Massachusetts, Amherst.

Cui, et al., "A survey on network embedding", IEEE Transactions on Knowledge and Data Engineering, vol. 31, Issue: 5, May 1, 2019, pp. 833-852, IEEE.

D'Amour, et al., "Underspecification Presents Challenges for Credibility in Modern Machine Learning", Underspecification in Machine Learning, online: https://arxiv.org/pdf/2011.03395.pdf, Nov. 2020, 59 pages.

De Bono, Edward, "The Mechanism of Mind", 1967, 276 pages, Penguin Books.

Düntsch, et al., "Modal-style operators in qualitative data analysis", 2002 IEEE International Conference on Data Mining, 2002. Proceedings, Dec. 2002, pp. 155-162, IEEE, Maebashi City, Japan.

Franco, et al., "Grocery product detection and recognition", Expert Systems With Applications 81 (2017), pp. 163-176, Elsevier Ltd.

George, et al., "Recognizing Products: A Per-exemplar Multi-label Image Classification Approach", ECCV 2014, Part II, LNCS 8690, 2014, pp. 440-455, Springer International Publishing Switzerland.

Goertzel, et al., "CogPrime Architecture for Embodied Artificial General Intelligence", 2013 IEEE Symposium on Computational Intelligence for Human-like Intelligence (CIHLI), Apr. 2013, pp. 60-67, IEEE, Singapore.

Goertzel, Ben, "OpenCogPrime: A Cognitive Synergy Based Architecture for Artificial General Intelligence", 2009 8th IEEE International Conference on Cognitive Informatics, Jun. 2009, pp. 60-68, IEEE, Hong Kong, China.

Gorban, et al., "Blessing of dimensionality: mathematical foundations of the statistical physics of data", Philosophical Transactions of the Royal Society A: Mathematical, Physical and Engineering Sciences, 376.2118, Jan. 2008, 18 pages, The Royal Society Publishing.

Grover, et al., "node2vec: Scalable Feature Learning for Networks", KDD '16: Proceedings of the 22nd ACM SIGKDD International Conference on Knowledge Discovery and Data Mining, Aug. 2016, pp. 855-864, Association for Computing Machinery, New York, NY.

Hamilton, et al., "Representation Learning on Graphs: Methods and Applications", Bulletin of the IEEE Computer Society Technical Committee on Data Engineering, 2017, 23 pages, IEEE.

Hammer, et al., "A Reasoning Based Model for Anomaly Detection in the Smart City Domain", IntelliSys 2020, AISC 1251, pp. 144-159, 2021, Springer Nature Switzerland AG.

Hobbs, Jerry R., "Granularity", In Proceedings of the Ninth International Joint Conference on Artificial Intelligence, 1985, pp. 432-435, Morgan Kaufmann.

Horowitz, Alexandra, "Smelling themselves: Dogs investigate their own odours longer when modified in an "olfactory mirror" test", Behavioural Processes, 2017, 41 pages.

Jacob, et al., "A Demonstration of the Exathlon Benchmarking Platform for Explainable Anomaly Detection", Proceedings of the VLDB Endowment (PVLDB), Oct. 2021, 5 pages, HAL Open Science.

Jawed, et al., "Self-Supervised Learning for Semi-Supervised Time Series Classification", Pacific-Asia Conference on Knowledge Discovery and Data Mining, PAKDD 2020: Advances in Knowledge Discovery and Data Mining, May 2020, pp. 499-511, Lecture Notes in Computer Science, vol. 12084.

Johnson, Mark, "The Body in The Mind", 1987, 268 pages, The University of Chicago Press.

Jordan, Jeremy, "An Overview of Semantic Image Segmentation", online: https://www.jeremyjordan.me/semantic-segmentation/, May 21, 2018, 20 pages.

Kiryati, et al., "A probabilistic Hough transform", Pattern Recognition. 24(4), 1991, pp. 303-316, The Pattern Recognition Society.

Korzybski, Alfred, "Manhood of Humanity, The Science and Art of Human Engineering", 1921, 240 pages, E. P. Dutton & Company, New York, NY.

Korzybski, Alfred, "Science and Sanity: An Introduction to Non-Aristotelian Systems and General Semantics", 5th Edition, 1994, 910 pages, Institute of General Semantics, New York, NY.

Korzybski, Alfred, "Videos—This Is Not That", online: https://www.thisisnotthat.com/korzybski-videos/, accessed Nov. 18, 2021, 7 pages.

Lakoff, G., "Women, Fire, and Dangerous Things", 1984, 631 pages, University of Chicago Press.

(56) References Cited

OTHER PUBLICATIONS

Latapie, et al., "A Metamodel and Framework for Artificial General Intelligence from Theory to Practice", Journal of Artificial Intelligence and Consciousness, Feb. 12, 2021, 1:30, 24 pages, World Scientific Publishing Company.
Li, et al., "Concept learning via granular computing: A cognitive viewpoint", Information Sciences 298 (2015), Published Dec. 2014, pp. 447-467, Elsevier Inc.
Lieto, et al., "Conceptual Spaces for Cognitive Architectures: A Lingua Franca for Different Levels of Representation", Biologically Inspired Cognitive Architectures, May 19, 2017, 17 pages, Cognitive Robotics and Social Sensing Lab.
Lin, et al., "Progressive Mirror Detection", 2020 IEEE/CVF Conference on Computer Vision and Pattern Recognition (CVPR), Jun. 2020, 9 pages, IEEE, Seattle, WA.
Ma, et al., "Granular computing and Dual Galois Connection", Information Sciences, 177(23), 2007, pp. 5365-5377, Elsevier Inc.
MacAulay, Thomas, "Facebook's chief AI scientist says GPT-3 is 'not a very good' Q&A system", online: https://thenextweb.com/news/facebooks-yann-lecun-says-gpt-3-is-not-very-good- as-a-qa-or-dialog-system, Oct. 28, 2020, accessed Nov. 18, 2021, 3 pages.
Murahari, et la., "Improving Generative Visual Dialog by Answering Diverse Questions", Proceedings of the 2019 Conference on Empirical Methods in Natural Language Processing and the 9th International Joint Conference on Natural Language Processing, Nov. 2018, pp. 1449-1454, Association for Computational Linguistics, Hong Kong, China.
Park, et al., "Identifying Reflected Images from Object Detector in Indoor Environment Utilizing Depth Information", IEEE Robotics and Automation Letters, vol. 6, No. 2, Apr. 2021, pp. 635-642, IEEE.
Patel, et al., "Video Representation and Suspicious Event Detection Using Semantic Technologies", online: http://semantic-web-journal.net/system/files/swj2427.pdf, Semantic Web 0, Sep. 10, 2020, accessed Aug. 9, 2021, 25 pages, IOS Press.
Pauli, Wolfgang, "Part I. General: (A) theory. Some relations between electrochemical behaviour and the structure of colloids", Jan. 1935, pp. 11-27, Transactions of the Faraday Society, vol. 1.
Scarselli, et al., "The Graph Neural Network Model", IEEE Transactions on Neural Networks (vol. 20, Issue: 1, Jan. 2009), pp. 61-80, IEEE.
Speer, et al., "ConceptNet 5.5: An Open Multilingual Graph of General Knowledge", online: https://arxiv.org/pdf/1612.03975.pdf, 2017, 9 pagers, Association for the Advancement of Artificial Intelligence.
Swanson, Bret, "The Exponential Internet", online: https://www.uschamberfoundation.org/bhq/exponential-internet, accessed Nov. 19, 2021, 8 pages, The U.S. Chamber of Commerce Foundation.
Tan, et al., "EfficientDet: Scalable and Efficient Object Detection", online: https://arxiv.org/pdf/1911.09070.pdf, Jul. 2020, 10 pages.
Taylor, J. G., "CODAM: A neural network model of consciousness", Neural Networks 20 (2007), pp. 983-992, Elsevier Ltd.
Thorisson, et al., "Cumulative Learning", Artificial General Intelligence—12th International Conference, AGI 2019, Proceedings, pp. 198-208, Springer.
Thórisson, Kristinn R., "A New Constructivist AI: From Manual Methods to Self-Constructive Systems", Chapter 9, Apr. 2012, pp. 147-174, Atlantis Press Book.
Thorisson, Kristinn R., "Integrated AI Systems", Minds & Machines, Mar. 17, 2007, pp. 11-25.
Tonioni, et al., "Product recognition in store shelves as a sub-graph isomorphism problem", online: https://arxiv.org/abs/1707.08378, Sep. 2017, 14 pages.
Tripathy, et al., "Explaining Anomalies in Industrial Multivariate Time-Series Data with the Help of eXplainable AI", 2022 IEEE International Conference on Big Data and Smart Computing (BigComp), Jan. 2022, 8 pages, IEEE, Republic of Korea.
Unger, et al., "The Singular Universe and the Reality of Time: A Proposal in Natural Philosophy", 2015, 558 pages, Cambridge University Press.
Unger, R. M. 2014. "Roberto Unger: Free Classical Social Theory from Illusions of False Necessity", Online Lecture. 45 pages Retrieved on Nov. 22, 2021 from https://www.youtube.com/watch?v=yYOOwNRFTcY.
Wang, et al., "Concept Analysis via Rough Set and AFS Algebra", Information Sciences 178 (2008), pp. 4125-4137, Elsevier Inc.
Wang, Pei, "Experience-grounded semantics: a theory for intelligent systems", Aug. 2004, 33 pages, Elsevier Science.
Wang, Pei, "Insufficient Knowledge and Resources—A Biological Constraint and Its Functional Implications", Biologically Inspired Cognitive Architectures II: Papers from the AAAI Fall Symposium (FS-09-01), 2009, pp. 188-193, Association for the Advancement of Artificial Intelligence (www.aaai.org).
Wang, Pei, "Non-axiomatic logic (nal) specification", online: http://citeseerx.ist.psu.edu/viewdoc/download?doi=10.1.1.167.2069&rep=rep1&type=pdf, Oct. 2009, 88 pages.
Wang, Pei, "On Defining Artificial Intelligence", Journal of Artificial General Intelligence 10(2) 2019, pp. 1-37, Sciendo.
Wang, et al. "Self in NARS, an AGI System", vol. 5, Article, Mar. 20, 2018, 15 pages, Frontiers in Robotics and AI.
Wang, et al., "SuperGLUE: A Stickier Benchmark for General-Purpose Language Understanding Systems", online: https://arxiv.org/pdf/1905.00537.pdf, 2019, 29 pages, 33rd Conference on Neural Information Processing Systems (NeurIPS 2019), Vancouver, Canada.
Wikipedia, "Wheat and chessboard problem", online: https://en.wikipedia.org/wiki/Wheat_and_chessboard_problem, Oct. 2021, 5 pages, Wikimedia Foundation, Inc.
Wille, Rudolf, "Restructuring Lattice Theory: An Approach Based on Hierarchies of Concepts", I. Rival (Ed.), Ordered Sets, 1982, pp. 314-339.
Xue, et al., "Real-Time Anomaly Detection and Feature Analysis Based on Time Series for Surveillance Video", IEEE 5th International Conference on Universal Village • UV2020 • Session 3ABD-7, Oct. 2020, 7 pages, IEEE, Boston, MA.
Yang, et al., "Semi-automatic Image and Video Annotation System for Generating Ground Truth Information", 2018 International Conference on Information Networking (ICOIN), Jan. 2018, pp. 821-824, IEEE, Chiang Mai, Thailand.
Yao, et al., "A Granular Computing Paradigm for Concept Learning", Emerging Paradigms in Machine Learning, Springer, London, pp. 307-326, 2012.
Yao, Y. Y., "Information Granulation and Rough Set Approximation", International Journal of Intelligent Systems, vol. 16, No. 1, 87-104, 2001.
Yao, Y. Y., "Integrative levels of granularity", Human-Centric Information Processing Through Granular Modelling, 2009, 20 pages, Studies in Computational Intelligence, vol. 182. Springer, Berlin, Heidelberg.
Ying, et al., "Graph convolutional neural networks for web-scale recommender systems", online: https://arxiv.org/pdf/1806.01973.pdf, In KDD '18: The 24th ACM SIGKDD International Conference on Knowledge Discovery & Data Mining, Aug. 19-23, 2018, London, United Kingdom. ACM, New York, NY, USA, 10 pages.
Zhou, et al., "Graph neural networks: A review of methods and applications", AI Open, 2020, pp. 57-81, Elsevier B.V.
Zhu, et al., "Describing Unseen Videos via Multi-modal Cooperative Dialog Agents" Computer Vision—ECCV 2020, 17 pages, Lecture Notes in Computer Science, vol. 12368. Springer.

* cited by examiner

AUTOMATIC METAMODEL GENERATION FOR ARTIFICIAL INTELLIGENCE REASONING

TECHNICAL FIELD

The present disclosure relates generally to computer networks, and, more particularly, to automatic metamodel generation for artificial intelligence reasoning.

BACKGROUND

Video analytics techniques are becoming increasingly ubiquitous as a complement to new and existing surveillance systems. For instance, person detection and reidentification now allows for a specific person to be tracked across different video feeds throughout a location. More advanced video analytics techniques also attempt to detect certain types of events/activities, such as a person leaving a suspicious package in an airport. Underlying such functionality are machine learning (ML)/deep learning (DL) models that have been trained using a set of training data that include examples of the objects or activities to be detected by the model.

While ML/DL-based analytics models can be quite powerful, their capabilities are also a function of the training process used to generate them. Indeed, the performance of such a model in terms of recall, precision, etc., largely depend on the quality and quantity of training examples. In addition, the more robust the capabilities of the model, the more cumbersome the training process becomes. For instance, training a model to identify people in video is a relatively trivial task. However, training a model to not only identify people, but to also discern when the behavior of a person represents a potentially hazardous situation is much more difficult. In other words, the more intelligent/capable the model, the more demanding its training process will be. These training challenges are further compounded when ML/DL models are paired with semantic reasoning as part of a neuro-symbolic metamodel.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
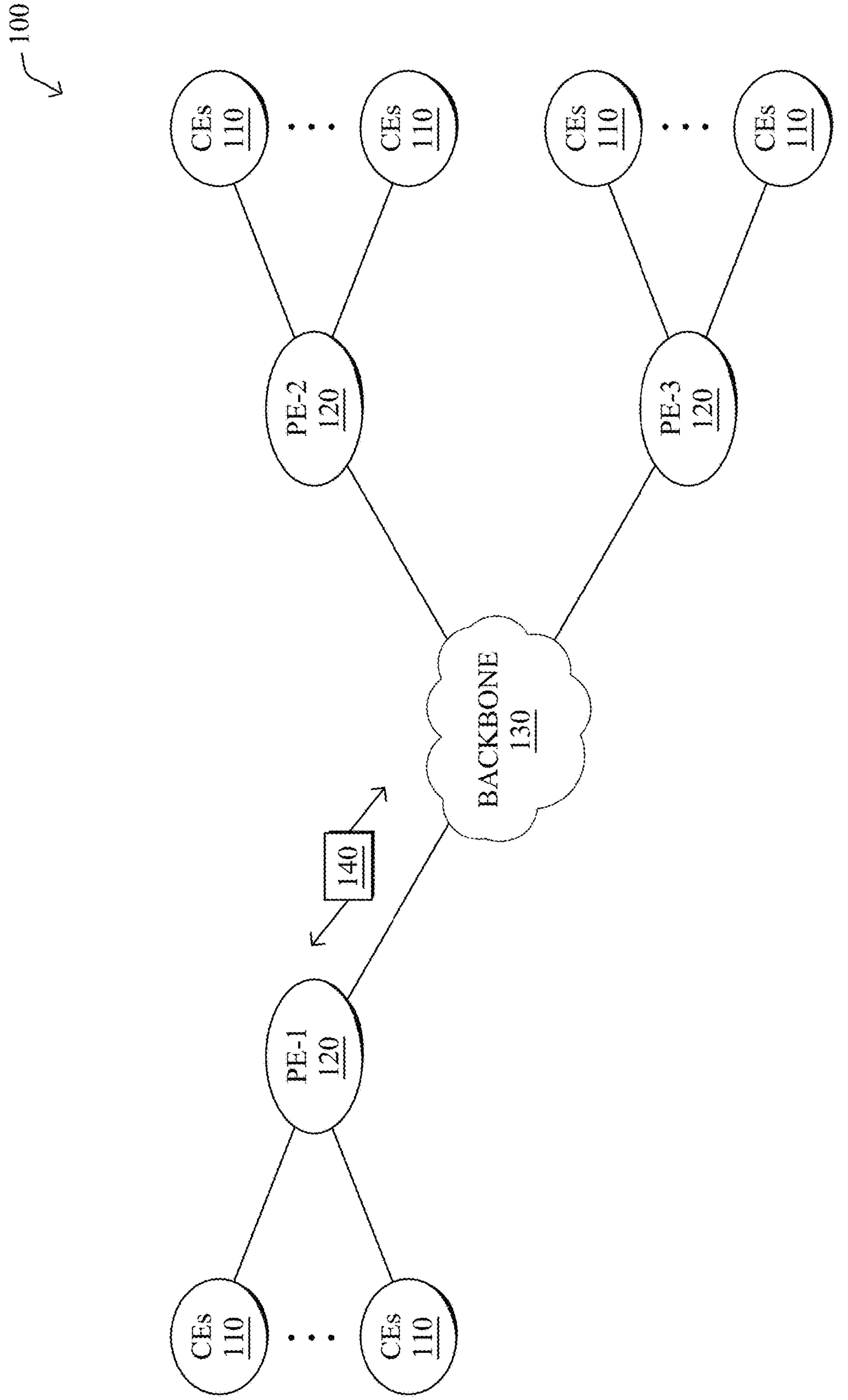
FIGS. 1A-1B illustrate an example computer network.

According to one or more embodiments of the disclosure, a student agent identifies a topic of interest. The student agent issues a set of one or more questions to a teacher agent regarding the topic of interest. The student agent receives, from the teacher agent, answer data in response to the set of one or more questions. The student agent uses the answer data to generate a neuro-symbolic metamodel that comprises a semantic reasoner and a sub-symbolic layer.

DESCRIPTION

A computer network is a geographically distributed collection of nodes interconnected by communication links and segments for transporting data between end nodes, such as personal computers, cellular phones, workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to forward data from one network to another.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN utilizing a Service Provider network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers) using a single CE router, with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
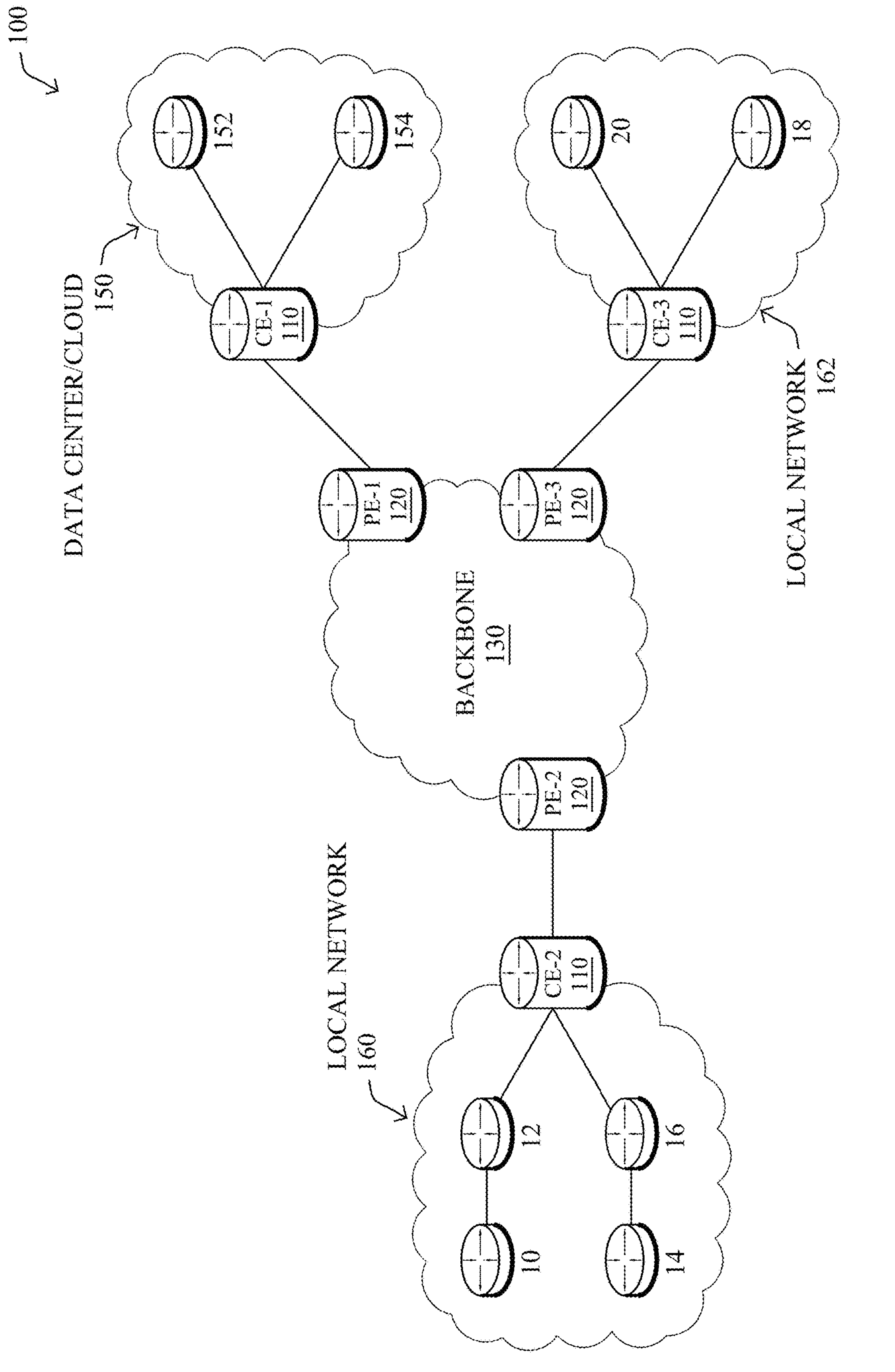

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often deployed on what are referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for devices/nodes 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.).

The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
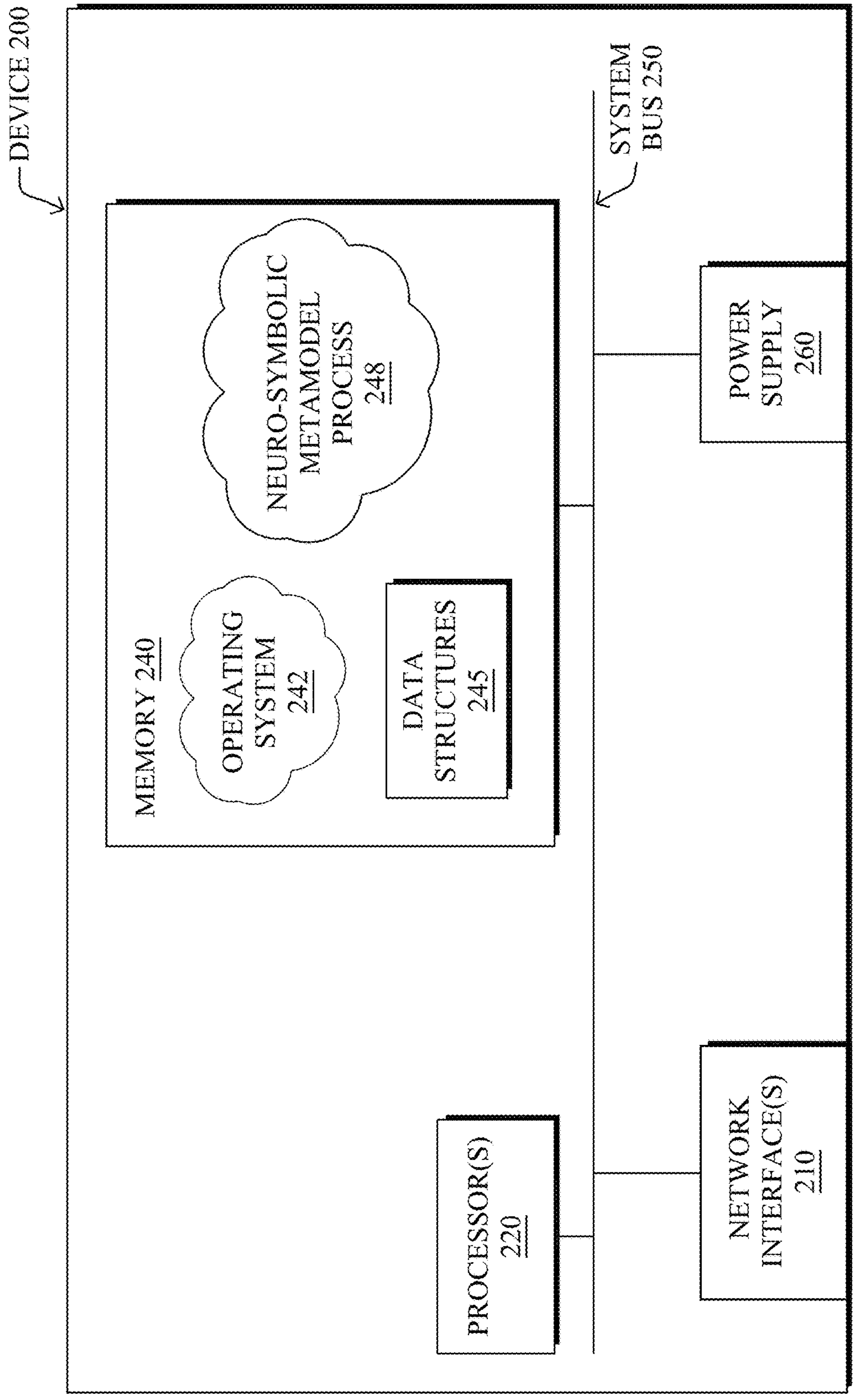
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a neuro-symbolic metamodel process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Metamodel process 248 includes computer executable instructions that, when executed by processor(s) 220, cause device 200 to provide cognitive reasoning services to a network. In various embodiments, metamodel process 248 may utilize artificial intelligence/machine learning techniques, in whole or in part, to perform its analysis and reasoning functions. In general, machine learning is concerned with the design and the development of techniques that take as input empirical data (such as network statistics and performance indicators) and recognize complex patterns in these data. One very common pattern among machine learning techniques is the use of an underlying model M, whose hyper-parameters are optimized for minimizing the cost function associated to M, given the input data. The learning process then operates by adjusting the hyper-parameters such that the number of misclassified points is minimal. After this optimization phase (or learning phase), the model M can be used very easily to classify new data points. Often, M is a statistical model, and the minimization of the cost function is equivalent to the maximization of the likelihood function, given the input data.

In various embodiments, metamodel process 248 may employ one or more supervised, unsupervised, or self-supervised machine learning models. Generally, supervised learning entails the use of a training large set of data, as noted above, that is used to train the model to apply labels to the input data. For example, in the case of video recognition and analysis, the training data may include sample video data that depicts a certain object and is labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Self-supervised is a representation learning approach that eliminates the pre-requisite requiring humans to label data. Self-supervised learning systems extract and use the naturally available relevant context and embedded metadata as supervisory signals. Self-supervised learning models take a middle ground approach: it is different from unsupervised learning as systems do not learn the inherent structure of data, and it is different from supervised learning as systems learn entirely without using explicitly-provided labels.

Example machine learning techniques that metamodel process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like. Accordingly, metamodel process 248 may employ deep learning, in some embodiments. Generally, deep learning is a subset of machine learning that employs ANNs with multiple layers, with a given layer extracting features or transforming the outputs of the prior layer.

The performance of a machine learning model can be evaluated in a number of ways based on the number of true positives, false positives, true negatives, and/or false negatives of the model. For example, the false positives of the model may refer to the number of times the model incorrectly identified an object or condition within a video feed. Conversely, the false negatives of the model may refer to the number of times the model failed to identify an object or condition within a video feed. True negatives and positives may refer to the number of times the model correctly determined that the object or condition was absent in the video or was present in the video, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
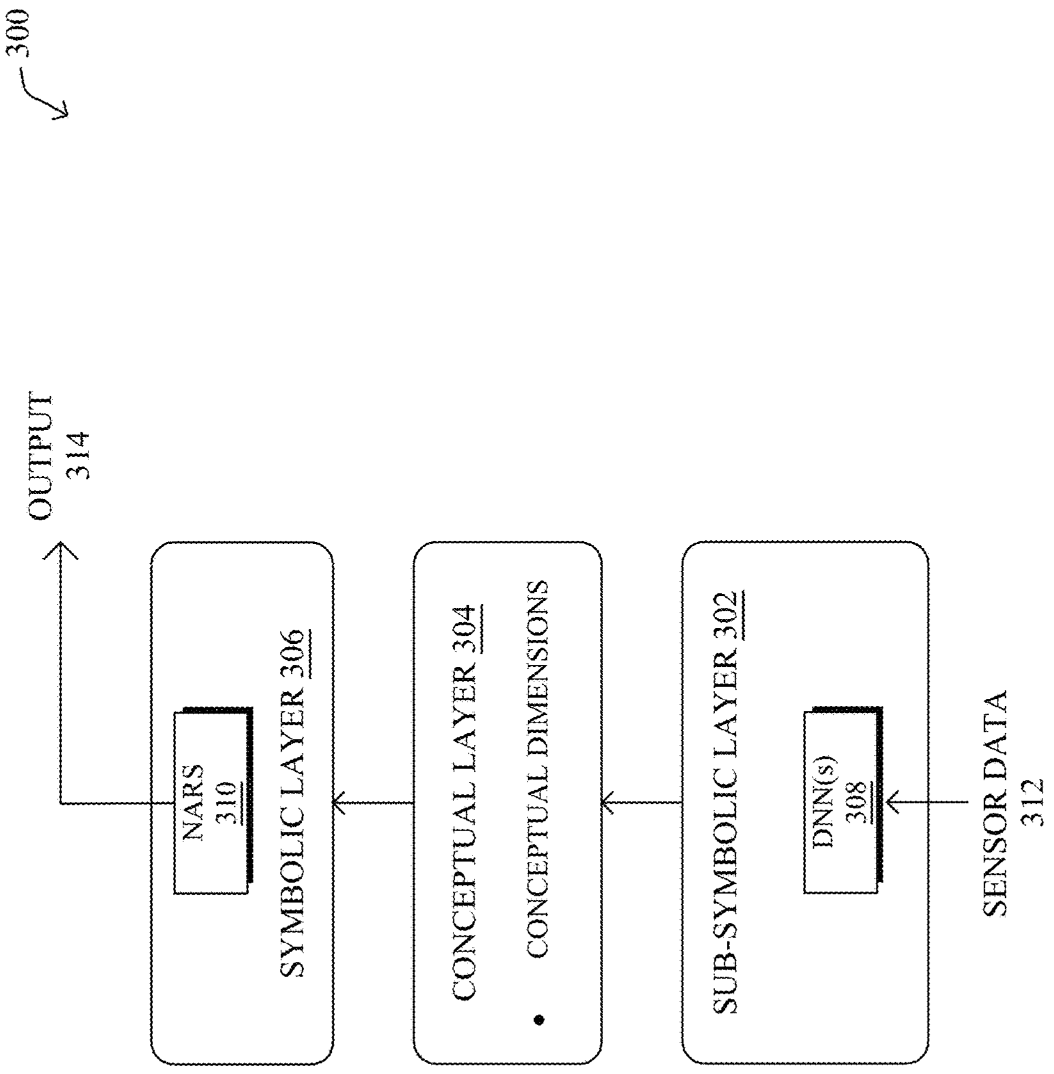
FIG. 3 illustrates an example hierarchy for a neuro-symbolic metamodel.

According to various embodiments, FIG. 3 illustrates an example hierarchy 300 for a neuro-symbolic metamodel. For example, metamodel process 248 shown in FIG. 2 may execute a neuro-symbolic metamodel for any number of purposes. In particular, metamodel process 248 may be configured to analyze sensor data in an IoT deployment (e.g., video data, etc.), to analyze networking data for purposes of network assurance, control, enforcing security policies and detecting threats, facilitating collaboration, or, as described in greater detail below, to aid in the development of a collaborative knowledge generation and learning system for visual programming.

In general, a reasoning engine, also known as a 'semantic reasoner,' 'reasoner,' or 'rules engine,' is a specialized form of machine learning software that uses asserted facts or axioms to infer consequences, logically. Typically, a reasoning engine is a form of inference engine that applies inference rules defined via an ontology language. As introduced herein, a neuro-symbolic metamodel is an enhanced form of reasoning engine that further leverages the power of sub-symbolic machine learning techniques, such as neural networks (e.g., deep learning), allowing the system to operate across the full spectrum of sub-symbolic data all the way to the symbolic level.

At the lowest layer of hierarchy 300 is sub-symbolic layer 302 that processes the sensor data 312 collected from the network. For example, sensor data 312 may include video feed/stream data from any number of cameras located throughout a location. In some embodiments, sensor data 312 may comprise multimodal sensor data from any number of different types of sensors located throughout the location. At the core of sub-symbolic layer 302 may be one or more DNNs 308 or other machine learning-based model that processes the collected sensor data 312. In other words, sub-symbolic layer 302 may perform sensor fusion on sensor data 312 to identify hidden relationships between the data.

At the opposing end of hierarchy 300 may be symbolic layer 306 that may leverage symbolic learning. In general, symbolic learning includes a set of symbolic grammar rules specifying the representation language of the system, a set of symbolic inference rules specifying the reasoning competence of the system, and a semantic theory containing the definitions of "meaning." This approach differs from other learning approaches that try to establish generalizations from facts as it is about reasoning and extracting knowledge from knowledge. It combines knowledge representations and reasoning to acquire and ground knowledge from observations in a non-axiomatic way. In other words, in sharp contrast to the sub-symbolic learning performed in layer 302, the symbolic learning and generalized intelligence performed at symbolic layer 306 requires a variety of reasoning and learning paradigms that more closely follows how humans learn and are able to explain why a particular conclusion was reached.

Symbolic learning models what are referred to as "concepts," which comprise a set of properties. Typically, these properties include an "intent" and an "extent," whereby the intent offers a symbolic way of identifying the extent of the concept. For example, consider the intent that represents motorcycles. The intent for this concept may be defined by properties such as "having two wheels" and "motorized," which can be used to identify the extent of the concept (e.g., whether a particular vehicle is a motorcycle).

Linking sub-symbolic layer 302 and symbolic layer 306 may be conceptual layer 304 that leverages conceptual spaces. In general, conceptual spaces are a proposed framework for knowledge representation by a cognitive system on the conceptual level that provides a natural way of representing similarities. Conceptual spaces enable the interaction between different type of data representations as an intermediate level between sub-symbolic and symbolic representations.

More formally, a conceptual space is a geometrical structure which is defined by a set of quality dimensions to allow for the measurement of semantic distances between instances of concepts and for the assignment of quality values to their quality dimensions, which correspond to the properties of the concepts. Thus, a point in a conceptual space S may be represented by an n-dimensional conceptual vector $v=<d_1, \ldots, d_i, \ldots, d_n>$ where $d_i$ represents the quality value for the $i^{th}$ quality dimension. For example, consider the concept of taste. A conceptual space for taste may include the following dimensions: sweet, sour, bitter, and salty, each of which may be its own dimension in the conceptual space. The taste of a given food can then be represented as a vector of these qualities in a given space (e.g., ice cream may fall farther along the sweet dimension than that of peanut butter, peanut butter may fall farther along the salty dimension than that of ice cream, etc.). By representing concepts within a geometric conceptual space, similarities can be compared in geometric terms, based on the Manhattan distance between domains or the Euclidean distance within a domain in the space. In addition, similar objects can be grouped into meaningful conceptual space regions through the application of clustering techniques, which extract concepts from data (e.g., observations).

Said differently, a conceptual space is a framework for representing information that models human-like reasoning to compose concepts using other existing concepts. Note that these representations are not competing with symbolic or associationistic representations. Rather, the three kinds can be seen as three levels of representations of cognition with different scales of resolution and complementary. Namely, a conceptual space is built up from geometrical representations based on a number of quality dimensions that complements the symbolic and deep learning models of symbolic layer 306 and sub-symbolic layer 302, representing an operational bridge between them. Each quality dimension may also include any number of attributes, which present other features of objects in a metric subspace based on their measured quality values. Here, similarity between concepts is just a matter of metric distance between them in the conceptual space in which they are embedded.

In other words, a conceptual space is a geometrical representation which allows the discovery of regions that are physically or functionally linked to each other and to abstract symbols used in symbolic layer 306, allowing for the discovery of correlations shared by the conceptual domains during concepts formation. For example, an alert prioritization module may use connectivity to directly acquire and evaluate alerts as evidence. Possible enhancements may include using volume of alerts and novelty of adjacent (spatially/temporally) alerts, to tune level of alertness.

In general, the conceptual space at conceptual layer 304 allows for the discovery of regions that are naturally linked to abstract symbols used in symbolic layer 306. The overall model is bi-directional as it is planned for predictions and action prescriptions depending on the data causing the activation in sub-symbolic layer 302.

Layer hierarchy 300 shown is particularly appealing when matched with the attention mechanism provided by a cognitive system that operates under the assumption of limited resources and time-constraints. For practical applications, the reasoning logic in symbolic layer 306 may be non-axiomatic and constructed around the assumption of insufficient knowledge and resources (AIKR). It may be implemented, for example, with a Non-Axiomatic Reasoning System (open-NARS) 310. However, other reasoning engines can also be used, such as Auto-catalytic Endogenous Reflective Architecture (AERA), OpenCog, and the like, in symbolic layer 306, in further embodiments. Even Prolog may be suitable, in some cases, to implement a reasoning engine in symbolic layer 306. In turn, an output 314 coming from symbolic layer 306 may be provided to a user interface (UI) for review. For example, output 314 may comprise a video feed/stream augmented with inferences or conclusions made by the metamodel, such as the locations of unstocked or under-stocked shelves, etc.

By way of example of symbolic reasoning, consider the ancient Greek syllogism: (1.) All men are mortal, (2.) Socrates is a man, and (3.) therefore, Socrates is mortal. Depending on the formal language used for the symbolic reasoner, these statements can be represented as symbols of a term logic. For example, the first statement can be represented as "man→[mortal]" and the second statement can be represented as "{Socrates}→man." Thus, the relationship between terms can be used by the reasoner to make inferences and arrive at a conclusion (e.g., "Socrates is mortal"). Non-axiomatic reasoning systems (NARS) generally differ from more traditional axiomatic reasoners in that the former applies a truth value to each statement, based on the amount of evidence available and observations retrieved, while the latter relies on axioms that are treated as a baseline of truth from which inferences and conclusions can be made.

Thus, a neuro-symbolic metamodel generally refers to a cognitive engine capable of taking sub-symbolic data as input (e.g., raw or processed sensor data regarding a monitored system), recognizing symbolic concepts from that data, and applying symbolic reasoning to the concepts, to draw conclusions about the monitored system.

Figure 4:
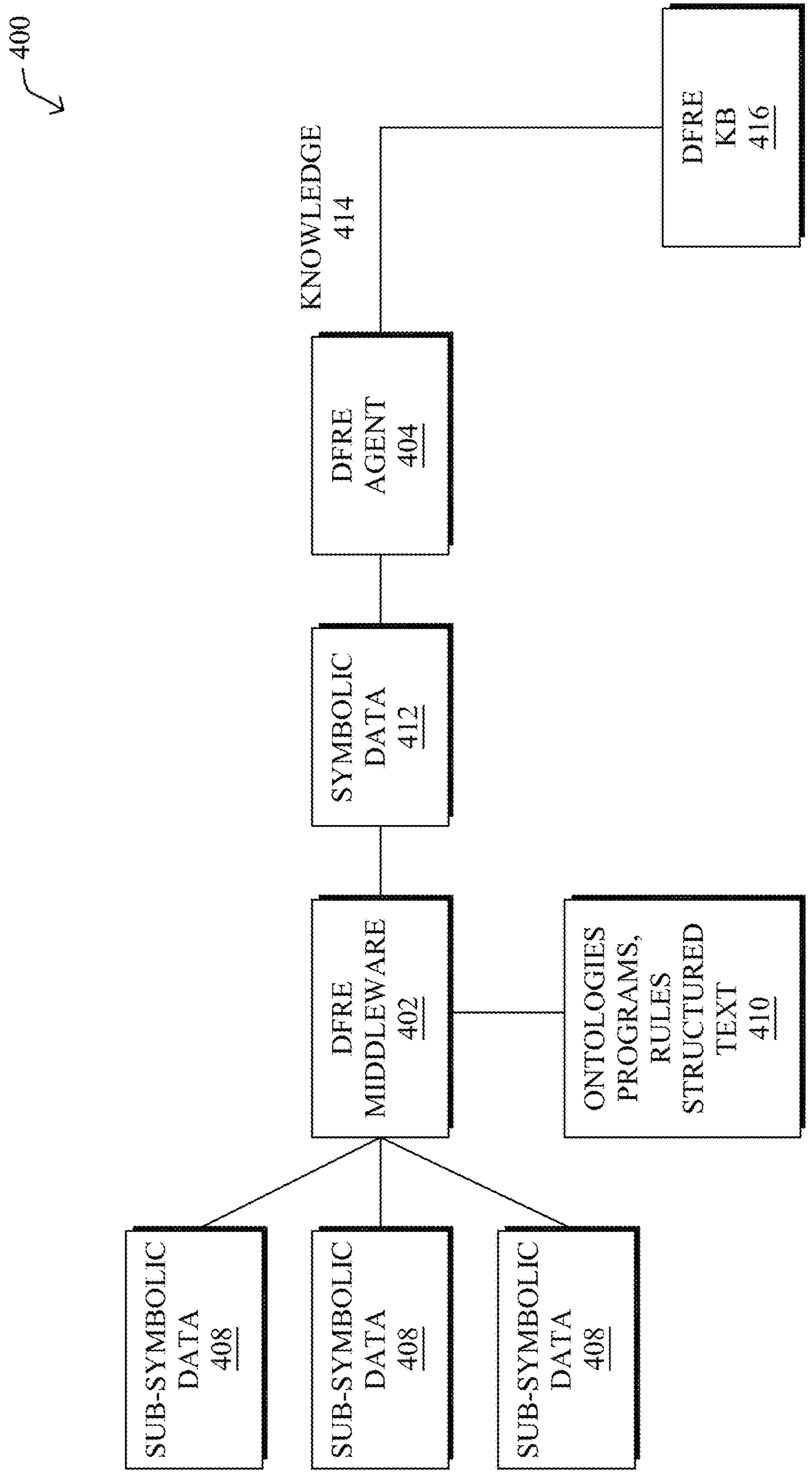
FIG. 4 illustrates an example metamodel architecture.

According to various embodiments, FIG. 4 illustrates an example neuro-symbolic metamodel architecture 400. As shown, architecture 400 may be implemented across any number of devices or fully on a particular device, as desired. At the core of architecture 400 may be middleware 402 that offers a collection of services, each of which may have its own interface. In general, middleware 402 may leverage a library for interfacing, configuring, and orchestrating each service of middleware 402.

In various embodiments, middleware 402 may also provide services to support semantic reasoning, such as by an AIKR reasoner. For example, as shown, middleware 402 may include a NARS agent that performs semantic reasoning for structural learning. In other embodiments, OpenCog or another suitable AIKR semantic reasoner could be used.

One or more metamodel agents 404 may interface with middleware 402 to orchestrate the various services available from middleware 402. In addition, metamodel agent 404 may feed and interact with the AIKR reasoner so as to populate and leverage a metamodel knowledge graph with knowledge.

More specifically, in various embodiments, middleware 402 may obtain sub-symbolic data 408. In turn, middleware 402 may leverage various ontologies, programs, rules, and/or structured text 410 to translate sub-symbolic data 408 into symbolic data 412 for consumption by metamodel agent 404. This allows metamodel agent 404 to apply symbolic reasoning to symbolic data 412, to populate and update a metamodel knowledge base (KB) 416 with knowledge 414 regarding the problem space (e.g., the network under observation, etc.). In addition, metamodel agent 404 can leverage the stored knowledge 414 in metamodel KB 416 to make assessments/inferences.

For example, metamodel agent 404 may perform semantic graph decomposition on metamodel KB 416 (e.g., a knowledge graph), so as to compute a graph from the knowledge graph of KB 416 that addresses a particular problem. Metamodel agent 404 may also perform post-processing on metamodel KB 416, such as performing graph cleanup, applying deterministic rules and logic to the graph, and the like. Metamodel agent 404 may further employ a definition of done, to check goals and collect answers using metamodel KB 416.

In general, metamodel KB 416 may comprise any or all of the following:

- Data
- Ontologies
- Evolutionary steps of reasoning
- Knowledge (e.g., in the form of a knowledge graph)
- The Knowledge graph also allows different reasoners to:
  - Have their internal subgraphs
  - Share or coalesce knowledge
  - Work cooperatively In other words, metamodel KB 416 acts as a dynamic and generic memory structure. In some embodiments, metamodel KB 416 may also allow different reasoners to share or coalesce knowledge, have their own internal sub-graphs, and/or work collaboratively in a distributed manner. For example, a first metamodel agent 404 may perform reasoning on a first sub-graph, a second metamodel agent 404 may perform reasoning on a second sub-graph, etc., to evaluate the health of the network and/or find solutions to any detected problems. To communicate with metamodel agent 404, metamodel KB 416 may include a bidirectional Narsese interface or other interface using another suitable grammar.

In various embodiments, metamodel KB 416 can be visualized on a user interface. For example, Cytoscape, which has its building blocks in bioinformatics and genomics, can be used to implement graph analytics and visualizations.

Said differently, architecture 400 may include any or all of the following the following components:

- Middleware 402 that comprises:
  - Structural learning component
  - JSON, textual data, ML/DL pipelines, and/or other containerized services (e.g., using Docker)
  - Hierarchical goal support
- Metamodel Knowledge Base (KB) 416 that supports:
  - Bidirectional Narseseese interface
  - Semantic graph decomposition algorithms
  - Graph analytics
  - Visualization services
- Metamodel Agent 404
  - Metamodel Control System More specifically, in some embodiments, middleware 402 may include any or all of the following:

Subsymbolic services:

Data services to collect sub-symbolic data for consumption

Reasoner(s) for structural learning

NARS

OpenCog

Optimized hierarchical goal execution

Probabilistic programming

Causal inference engines

Visualization Services (e.g., Cytoscape, etc.)

Middleware 402 may also allow the addition of new services needed by different problem domains.

During execution, metamodel agent 404 may, thus, perform any or all of the following:

Orchestration of services

Focus of attention

Semantic graph decomposition

Addresses combinatorial issues via an automated divide and conquer approach that works even in non-separable problems because the overall knowledge graph 416 may allow for overlap.

Feeding and interacting with the AIKR reasoner via bidirectional translation layer to the metamodel knowledge graph.

Call middleware services

Post processing of the graph

Graph clean-up

Apply deterministic rules and logic to the graph

Definition of Done (DoD)

Check goals and collect answers

Figure 5:
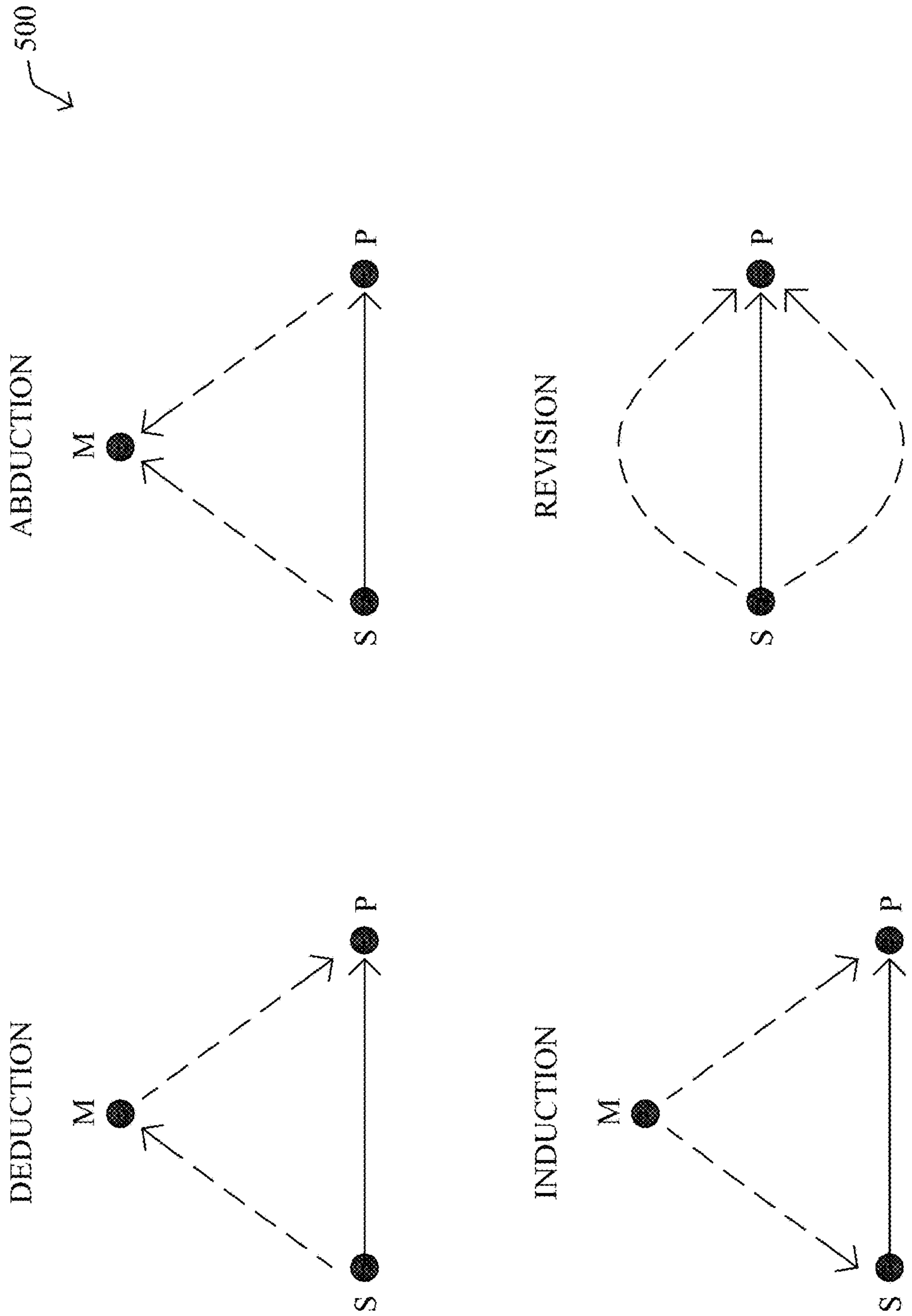
FIG. 5 illustrates an example of various inference types.

FIG. 5 illustrates an example 500 showing the different forms of structural learning that the neuro-symbolic metamodel framework can employ. More specifically, the inference rules in example 500 relate premises S→M and M→P, leading to a conclusion S→P. Using these rules, the structural learning herein can be implemented using an ontology with respect to an Assumption of Insufficient Knowledge and Resources (AIKR) reasoning engine, as noted previously. This allows the system to rely on finite processing capacity in real time and be prepared for unexpected tasks. More specifically, as shown, the metamodel may support any or all of the following:

Syllogistic Logic

Logical quantifiers

Various Reasoning Types

Deduction Induction

Abduction

Induction

Revision

Different Types of Inference

Local inference

Backward inference

Figure 6:
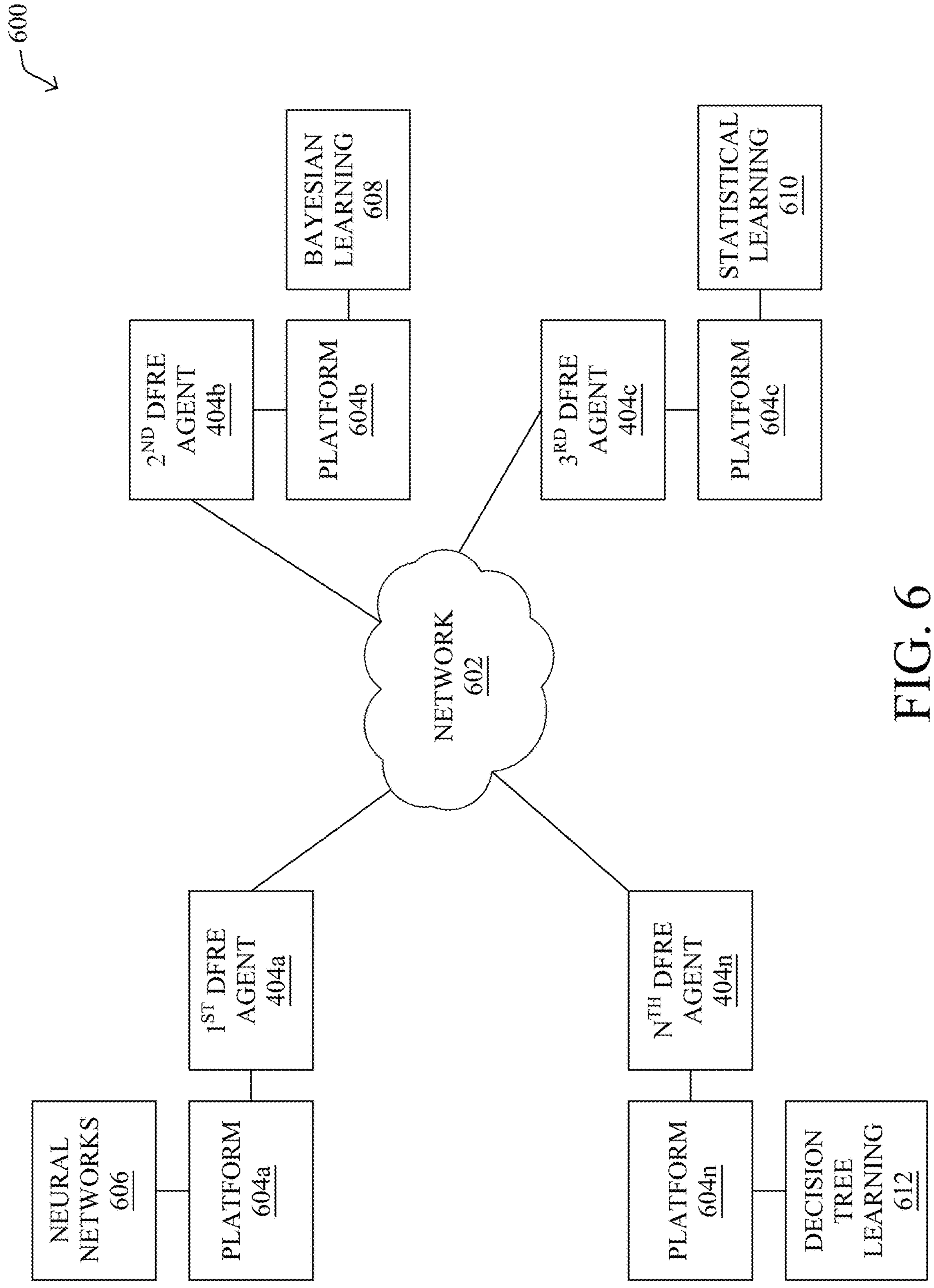
FIG. 6 illustrates an example architecture for multiple metamodel agents.

To address combinatorial explosion, the metamodel knowledge graph may be partitioned such that each partition is processed by one or more metamodel agents 404, as shown in architecture 600 in FIG. 6, in some embodiments. More specifically, any number of metamodel agents 404 (e.g., a first metamodel agent 404*a* through an $N^{th}$ metamodel agent 404*n*) may be executed by devices connected via a network 602 or by the same device. In some embodiments, metamodel agents 404*a*-404*n* may be deployed to different platforms (e.g., platforms 604*a*-604*n*) and/or utilize different learning approaches. For instance, metamodel agent 404*a* may leverage neural networks 606, metamodel agent 404*b* may leverage Bayesian learning 608, metamodel agent 404*c* may leverage statistical learning, and metamodel agent 404*n* may leverage decision tree learning 612.

As would be appreciated, graph decomposition can be based on any or all of the following:

Spatial relations—for instance, this could include the vertical industry of a customer, physical location (country) of a network, scale of a network deployment, or the like.

Descriptive properties, such as severity, service impact, next step, etc.

Graph-based components (isolated subgraphs, minimum spanning trees, all shortest paths, strongly connected components . . . )

Any new knowledge and related reasoning steps can also be input back to the knowledge graph, in various embodiments.

In further embodiments, the metamodel framework may also support various user interface functions, so as to provide visualizations, actions, etc. to the user. To do so, the framework may leverage Cytoscape, web services, or any other suitable mechanism.

Figure 7:
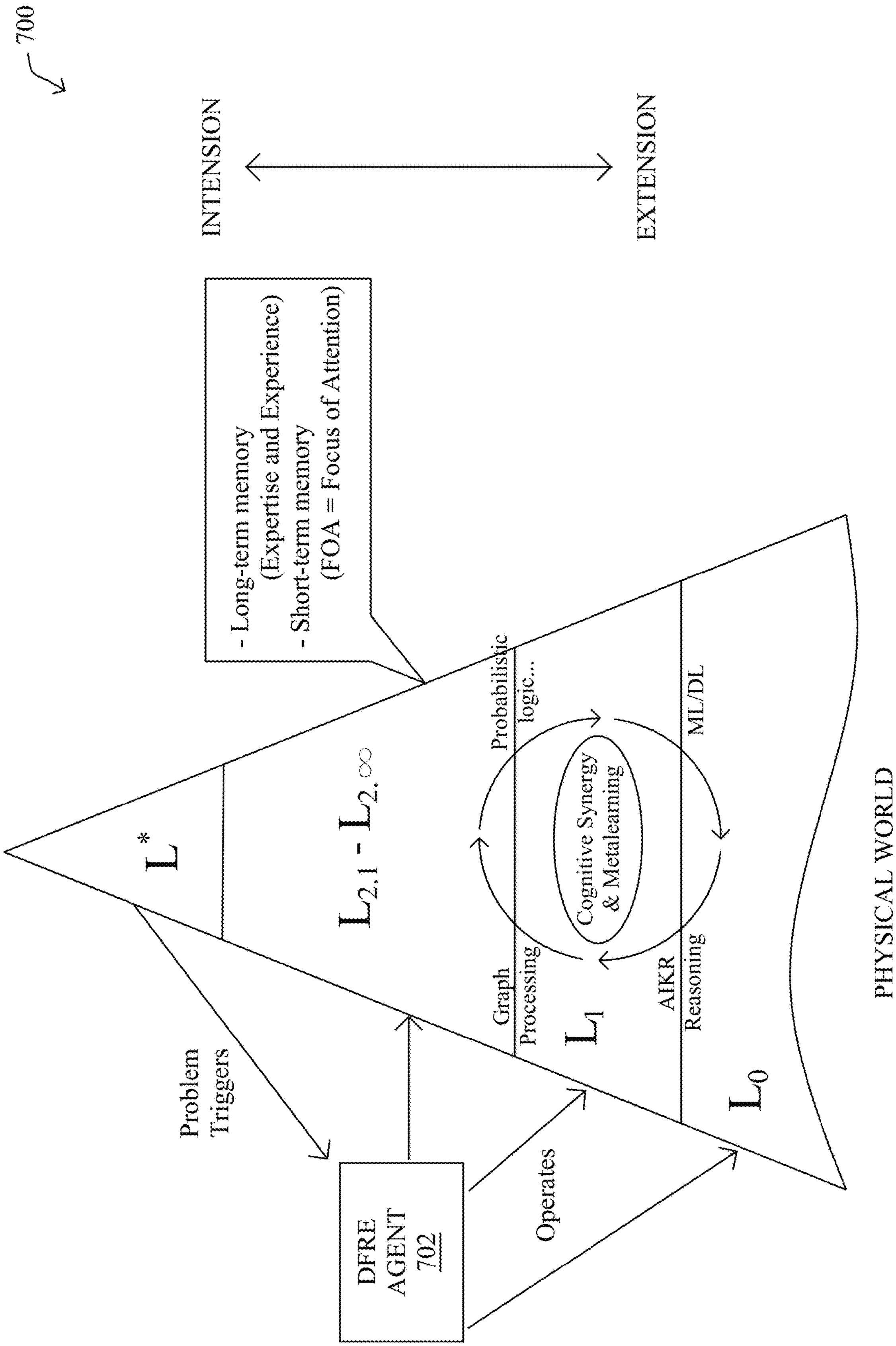
FIG. 7 illustrates an example neuro-symbolic metamodel.

At the core of the techniques herein is an artificial intelligence metamodel 700 for knowledge representation at different levels of abstraction, as shown in FIG. 7, according to various embodiments. In various embodiments, the metamodel knowledge graph groups information into four different levels, which are labeled $L_0$, $L_1$, $L_2$, and L* and represent different levels of abstraction, with $L_0$ being closest to raw data coming in from various sensors and external systems and $L_2$ representing the highest levels of abstraction typically obtained via mathematical means such as statistical learning and reasoning. L* can be viewed as the layer where high-level goals and motivations are stored. The overall structure of this knowledge is also based on anti-symmetric and symmetric relations.

One key advantage of the metamodel knowledge graph is that human level domain expertise, ontologies, and goals are entered at the $L_2$ level. This leads, by definition, to an unprecedented ability to generalize at the $L_2$ level thus minimizing the manual effort required to ingest domain expertise.

More formally:

L* represents the overall status of the abstraction. In case of a problem, it triggers problem solving in lower layers via a metamodel agent 702.

$L_{2\text{-}1}$-$L_{2.\infty}$=Higher level representations of the world in which most of concepts and relations are collapsed into simpler representations. The higher-level representations are domain-specific representations of lower levels.

$L_1$=has descriptive, teleological and structural information about $L_0$.

$L_0$=Object level is the symbolic representation of the physical world.

In various embodiments, $L_2$ may comprise both expertise and experience stored in long-term memory, as well as a focus of attention (FOA) in short-term memory. In other words, when a problem is triggered at L*, a metamodel agent 702 that operates on $L_2$-$L_0$ may control the FOA so as to focus on different things, in some embodiments.

As would be appreciated, there may be hundreds of thousands or even millions of data points that need to be extracted at $L_0$. The FOA of the metamodel is based on the abstraction and the knowledge graph (KG) may be used to keep combinatorial explosion under control.

Said differently, metamodel 700 may generally take the form of a knowledge graph in which semantic knowledge is stored regarding a particular system, such as a computer network and its constituent networking devices. By representing the relationships between such real-world entities (e.g., router A, router B, etc.), as well as their more abstract concepts (e.g., a networking router), metamodel agent 702 can make evaluations regarding the particular system at different levels of extraction. Indeed, metamodel 700 may differ from a more traditional knowledge graph through the inclusion of any or all of the following, in various embodiments:

- A formal mechanism to represent different levels of abstraction, and for moving up and down the abstraction hierarchy (e.g., ranging from extension to intension).
- Additional structure that leverages distinctions/anti-symmetric relations, as the backbone of the knowledge structures.
- Similarity/symmetric relation-based relations.

Thus, metamodel 700 is a neuro-symbolic metamodel that leverages both sub-symbolic processing (e.g., using deep/neural networks) and symbolic reasoning. This allows it to perform zero-shot learning whereby it is able to make inferences about objects, behaviors, interactions, conditions, and the like, that are outside those on which it was specifically trained, as well as one-shot learning of class labels. For instance, say the system uses a seed ontology comprising the concepts of 'standing' and 'running,' but is then encounters video data of a person walking. Even without specific knowledge about the concept of walking, the semantic reasoning engine may determine that this is an intermediate state between standing and running, based on the velocities involved, the pose analysis of the person, etc. This allows the system to learn different conditions and make inferences about situations that it may not have seen before.

As noted above, training machine learning (ML)/deep learning (DL)-based models can be quite cumbersome on its own. Indeed, the capabilities and performances of such models largely depend on the amount of training and training data/ground truth examples that are available. For instance, training a model to identify people within video can be relatively trivial, whereas training a model to discern when the behavior of a person represents a potentially hazardous situation is much more difficult. These complexities are further compounded when generating a neuro-symbolic metamodel, such as metamodel 700, that bridges symbolic and sub-symbolic processing.

——Automatic Metamodel Generation for Artificial Intelligence Reasoning——

The techniques herein allow for the automatic generation of a neuro-symbolic metamodel using student and teacher agents. In some aspects, the two agents may interact with one another via a question and answer mechanism, to capture information that can be used to generate a neuro-symbolic metamodel.

Illustratively, the techniques described herein may be performed by hardware, software, and/or firmware, such as in accordance with process 248, which may include computer executable instructions executed by the processor 220 (or independent processor of interfaces 210), to perform functions relating to the techniques described herein.

Specifically, according to various embodiments, a student agent identifies a topic of interest. The student agent issues a set of one or more questions to a teacher agent regarding the topic of interest. The student agent receives, from the teacher agent, answer data in response to the set of one or more questions. The student agent uses the answer data to generate a neuro-symbolic metamodel that comprises a semantic reasoner and a sub-symbolic layer.

Figure 8:
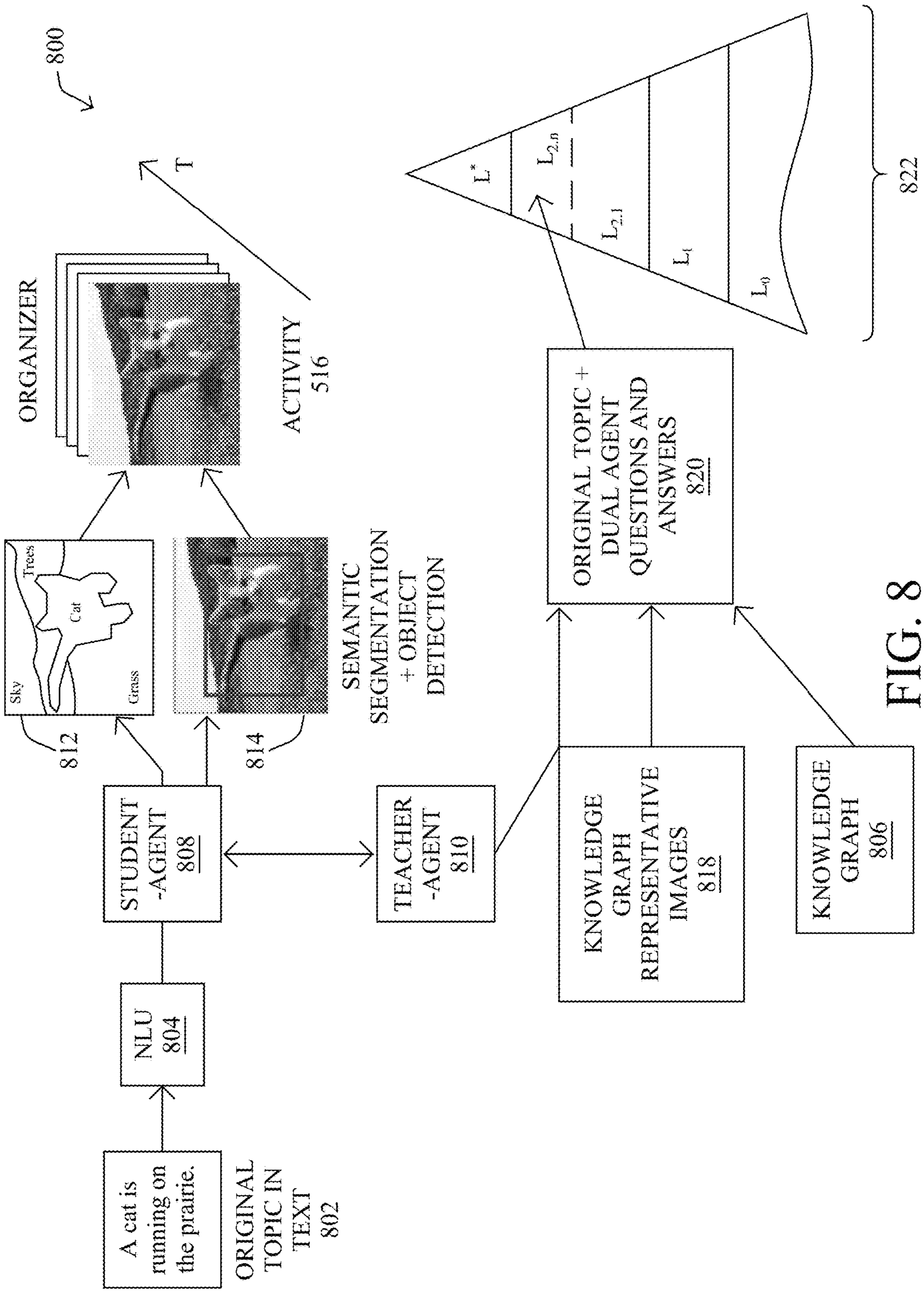
FIG. 8 illustrates an example of student and teacher agents interacting to generate a neuro-symbolic metamodel.

Operationally, FIG. 8 illustrates an example 800 of student and teacher agents interacting to generate a neuro-symbolic metamodel, as described in greater detail above. As shown, in order to generate a neuro-symbolic metamodel 822, a student agent 808 and a teacher agent 810 may be configured to interact with one another, in order to produce a set 820 of questions and answers, as well as the original topic, on which neuro-symbolic metamodel 822 may be trained/generated/updated, according to various embodiments. In various embodiments, student agent 808 and teacher agent 810 may be implemented through the execution of metamodel process 248 by one or more devices (e.g., a device 200). In the distributed case, the executing devices can also be viewed as their own singular device for purposes of performing the techniques herein, as well.

The question and answer generation mechanism may begin by student agent 808 identifying a topic of interest. For instance, as shown, assume that there is input data 802 that comprises a textual topic, such as "a cat is running on the prairie." Note that input data 802 may also include one or more media examples of the topic, such as an actual image, video, etc. depicting a cat running on the prairie, as well. In other embodiments, the examples may be provided to student agent 808 by asking teacher agent 810 for them. In various instances, student agent 808 may obtain input data 802 via a user interface (e.g., an engineer entering a topic to be learned), from a pre-established topical database, or even through an automated mechanism whereby student agent 808 seeks topics (e.g., via web searches, etc.) to learn.

Student agent 808 may leverage a natural language understanding (NLU) unit 804 that parses the textual topic in input data 802 and extracts concepts from it, in order to form textual queries to send to teacher agent 810. For instance, in the case of the topic of "a cat is running on the prairie," student agent 808 may not have an initial conception of what a cat is or looks like, what running entails, and/or what a prairie is or looks like.

In some embodiments, as shown, another function of student agent 808 may be to perform semantic segmentation 812 and/or object detection 814 on the example(s) of the topic. As would be appreciated, semantic segmentation seeks to assign a classification label to each pixel of an image. For instance, in the case of an image of a cat running on the prairie, the result of object detection 814 may be detect the presence of the cat and the result of semantic segmentation 812 may be to divide the image into regions classified as being one of: sky, trees, grass, or cat. In the case of video, for instance, a similar approach an also be taken by student agent 808 to perform activity identification 816 (e.g., by discerning between a stationary cat, a slow moving cat, and a running cat).

In order to provide suitable examples as answer data back to student agent 808, teacher agent 810 may leverage a knowledge graph 806. Associated with knowledge graph 806 may be media examples (e.g., images, video, and/or audio) of the answer returned back to student agent 808 for any given question. For instance, in the case of a cat, one of the initial questions asked by student agent 808 regarding the topic of input data 802 may be "What does a cat look like?" In response, teacher agent 810 may search knowledge graph 806 for the concept of a cat and return any number of representative images 818 from it to student agent 808.

As a result of the interactions between student agent 808 and teacher agent 810, set 820 will eventually be populated with the original topic, the questions issued by student agent 808, and the answer data provided by 810, such as examples of the answers. Thus, not only does set 820 represent discrete topics and labeled images that can be used to train the ML/DL model(s) of neuro-symbolic metamodel 822, but also the relationships between these concepts to represent the entire concept of the input topic (e.g., not just the concept of a cat, but the concept of a cat running on the prairie), which can be used to populate the conceptual layer(s) of neuro-symbolic metamodel 822 and support its semantic reasoning. Thus, even if neuro-symbolic metamodel 822 is later confronted with an image of a dog running on the prairie, so long as it has a basic conception of what a dog it, it can infer that the dog is on the prairie and that its corresponding action is 'running.'

Figure 9:
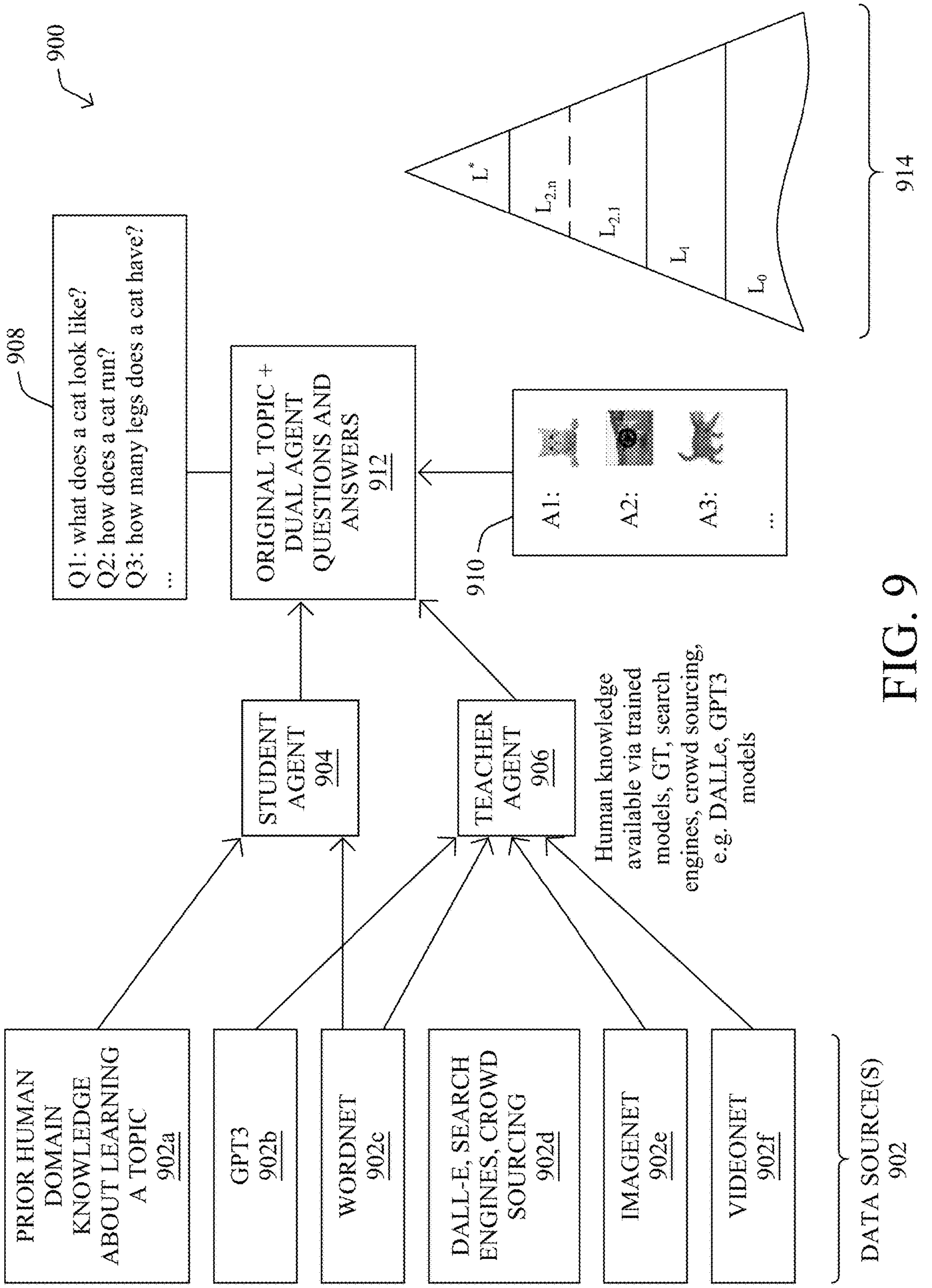
FIG. 9 illustrates an example of answer data being provided by a teacher agent to a student agent.

FIG. 9 illustrates an example 900 of answer data being provided by a teacher agent to a student agent, according to various embodiments. Continuing the example of FIG. 8, example 900 again shows the interactions of a student agent 904 and a teacher agent 906, so as to produce a set 912 of the original topic, questions from student agent 904, and answer data from teacher agent 906.

As shown, student agent 904 and/or teacher agent 906 may leverage any number of different data sources 902, to perform tasks such as identifying topics of interest, formulating questions, and returning answer data. By way of example, data sources 902 may include, but are not limited to, any or all of the following: prior human domain knowledge 902*a* about learning a topic, Generative Pre-trained Transformer 3 (GTP3) 902*b*, which is an autoregressive language model developed by OpenAI, Wordnet 902*c* (e.g., a lexical database of semantic relationships between words/concepts), other online sources 902*d* such as DALL-E from OpenAI, search engines, crowd sourcing sites, etc., ImageNet 902*e*, which is an image database organized according to Wordnet 902*c*, VideoNet 902*f*, which is a video database organized according to Wordnet 902*c*.

From these data sources 902, student agent 904 may formulate questions 908 regarding the topic of interest. For instance, in the case of the topic of a cat running in the prairie, student agent 904 may leverage Wordnet 902*c* and/or prior human domain knowledge 902*a*, to formulate questions such as "What does a cat look like?", "How does a cat run?", "How many legs does a cat have?" and the like. In turn, teacher agent 906 may leverage data sources 902, such as other online sources 902*d*, ImageNet 902, VideoNet 902*f*, etc., to provide answers 910. For instance, as shown, answers 910 may comprise an image of a cat, a video of a cat running, and an image of all four legs of a cat, each representing the answer to the respective questions issued by student agent 904.

In this way, set 912 may be formulated through the interactions between the two agents 904-906, and can be used to generate a neuro-symbolic metamodel 914, accordingly. For instance, in the case of metamodel 914 being used to analyze surveillance feeds, it may be used to analyze video data captured from at least one of: a port, a train station, a bus station, an airport, or a stadium, using its sub-symbolic layers to detect certain objects and actions, as well as its symbolic layers to perform semantic reasoning on their related concepts, to make inferences about the monitored environment.

As would be appreciated, the ontologies generated by the system and used for neuro-symbolic metamodel 914 or others may be associated with raw data that is categorized into nodes in an ontology based on some sort of similarity metric which may be spatio-, temporal-, and/or spatio-temporal in nature. In turn, the mechanism used to generate the ontology can also be used to align/match at least some of the nodes in the generated ontology with counterparts in any of the source ontologies on which it is based (e.g., Wordnet 902*c*, other human domain knowledge 902*a*, etc.). Indeed, there may be cases in which multiple nodes in the machine generated ontology can be aligned to the same human generated ontology. In these cases, the system could rank candidates (also based on the similarity metric) along with a measure of the relevance of the machine generated ontology, such as based on metrics that represent how often the node under consideration applies to the input data.

Figure 10:
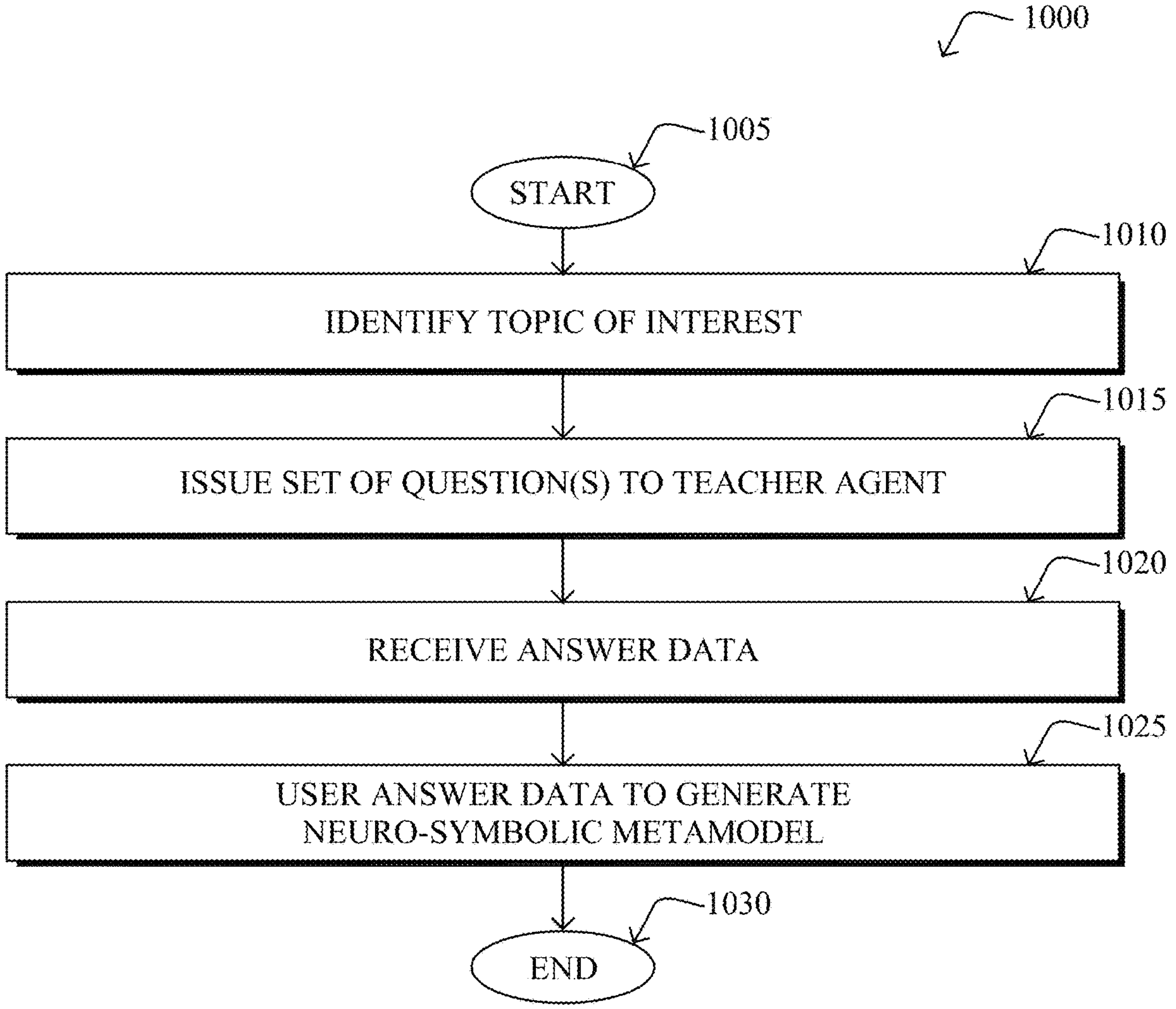
FIG. 10 illustrates an example simplified procedure for automatic metamodel generation for artificial intelligence reasoning.

In many cases, the machine-generated ontologies will likely be far greater in size and complexity than that of the human-sourced ontologies and language. In some embodiments, the system may also apply a quantization to its generated ontology, to map it to human language. For instance, there may be hundreds of ways that the system categorizes the basic action of a person walking (e.g., one category may correspond to a person walking faster than a threshold velocity, with their arms swinging, with a particular gait, etc.). However, as humans, such granular classification is often unnecessary as simply saying "the person is walking" is often enough to convey the idea. This functionality would be even more noticeable when the input data is not related to daily human activity. For example, processing massive datasets such as genetic, protein/molecular interactions, physics experiments, network telemetry, etc. may lead to very granular and difficult to understand levels of details. In various embodiments, to address this, the system may take any or all of the following approaches:

- Leveraging plausible words for new concepts that could be amenable to human language
- Using unique numbers/identifiers for each Regardless, another potential function of the system when generating a neuro-symbolic metamodel may be to align the generated ontology associated with the metamodel with one or more human-generated ontologies and/or a human language, to aid in the explainability of the conclusions made by the metamodel during use. FIG. 10 illustrates an example simplified procedure (e.g., a method) for automatic metamodel generation for artificial intelligence reasoning, in accordance with one or more embodiments described herein. For example, a non-generic, specifically configured device (e.g., device 200) may perform procedure 1000 by executing stored instructions (e.g., process 248), such as to function as a student agent in accordance with the techniques herein. The procedure 1000 may start at step 1005, and continues to step 1010, where, as described in greater detail above, the student agent may identify a topic of interest. In some embodiments, the student agent uses natural language processing to identify the topic of interest. In various embodiments, the topic of interest comprises a particular type of action associated with a particular type of object.

At step 1015, as detailed above, the student agent may issue a set of one or more questions to a teacher agent regarding the topic of interest. For instance, in the case of the topic involving a particular type of object, the one or more questions may ask At step 1020, the student agent may receive, from the teacher agent, answer data in response to the set of one or more questions, as described in greater detail above. In some embodiments, the answer data comprises images. In one embodiment, the teacher agent bases the answer data on results from a search engine. In another embodiment, the teacher agent bases the answer data on crowdsourced or human-provided information.

At step 1025, as detailed above, the student agent may use the answer data to generate a neuro-symbolic metamodel that comprises a semantic reasoner and a sub-symbolic layer. In some embodiments, the metamodel is generated in part by populating a knowledge graph that links the sub-symbolic layer to a symbolic layer on which the semantic reasoner operates. In further embodiments, the metamodel performs semantic segmentation and object detection on the answer data. In another embodiment, the metamodel may be generated in part by training a neural network at the sub-symbolic layer of the neuro-symbolic metamodel using the answer data. In various embodiments, the neuro-symbolic metamodel is then used to analyze video data captured from at least one of: a port, a train station, a bus station, an airport, or a stadium.

Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for automatic metamodel generation for artificial intelligence reasoning, it is to be understood that various other adaptations and modifications may be made within the spirit and scope of the embodiments herein. For example, while certain embodiments are described herein with respect to specific types of artificial intelligence development systems, the techniques can be extended without undue experimentation to other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

identifying, by a student agent that is a first reasoning system metamodel agent, a topic of interest;

issuing, by the student agent, a set of one or more questions to a teacher agent regarding the topic of interest, wherein the teacher agent is a second reasoning system metamodel agent;

receiving, at the student agent and from the teacher agent, answer data in response to the set of one or more questions, wherein the answer data is obtained by the teacher agent searching a teacher knowledge graph accessible to the teacher agent for a concept identified in a respective question of the set of one or more questions and returning, as the answer data, one or more representative media items associated with the concept in the teacher knowledge graph accessible to the teacher agent; and using, by the student agent, the answer data to generate a neuro-symbolic metamodel that comprises a semantic reasoner and a plurality of layers ranging from a sub-symbolic layer to a symbolic layer, wherein using the answer data to generate the neuro-symbolic metamodel comprises populating a metamodel knowledge graph that represents cross-layer mappings as relations between nodes of the sub-symbolic layer corresponding to learned features and nodes of the symbolic layer corresponding to concepts, wherein the semantic reasoner operates on the symbolic layer using the relations.

2. The method as in claim 1, wherein the student agent uses natural language processing to identify the topic of interest.

3. The method as in claim 1, wherein the answer data comprises images.

4. The method as in claim 1, wherein the relations in the metamodel knowledge graph include symmetric and anti-symmetric relations and link the sub-symbolic layer to the symbolic layer.

5. The method as in claim 1, wherein using the answer data to generate the neuro-symbolic metamodel comprises:

performing, by the student agent, semantic segmentation and object detection on at least one of the one or more representative media items to identify regions and objects represented in the at least one representative media item.

6. The method as in claim 1, wherein the one or more representative media items associated with the concept are based on results from a search engine.

7. The method as in claim 1, wherein the one or more representative media items associated with the concept are based on crowdsourced or human-provided information.

8. The method as in claim 1, wherein the topic of interest comprises a particular type of action associated with a particular type of object.

9. The method as in claim 1, wherein using the answer data to generate the neuro-symbolic metamodel comprises:

training a neural network at the sub-symbolic layer of the neuro-symbolic metamodel using the answer data, wherein the neural network is configured to output the learned features.

10. The method as in claim 1, wherein the neuro-symbolic metamodel is used to analyze video data captured from at least one of:

a port, a train station, a bus station, an airport, or a stadium.

11. The method as in claim 1, wherein using the answer data to generate the neuro-symbolic metamodel comprises using a set comprising the topic of interest, the set of one or more questions, and the answer data to populate the metamodel knowledge graph.

12. The method as in claim 1, wherein the student agent generates the set of one or more questions by parsing the topic of interest to extract one or more concepts and formulating the set of one or more questions based on the extracted one or more concepts, and wherein the extracted one or more concepts are used to populate concept nodes of the metamodel knowledge graph corresponding to the symbolic layer.

13. An apparatus, comprising:

a network interface to communicate with a computer network;

a processor coupled to the network interface and configured to execute one or more processes; and a memory configured to store a process that is executed by the processor, the process when executed configured to:

identify, by a student agent that is a first reasoning system metamodel agent, a topic of interest;

issue, by the student agent, a set of one or more questions to a teacher agent regarding the topic of interest, wherein the teacher agent is a second reasoning system metamodel agent;

receive, at the student agent and from the teacher agent, answer data in response to the set of one or more questions, wherein the answer data is obtained by the teacher agent searching a teacher knowledge graph accessible to the teacher agent for a concept identified in a respective question of the set of one or more questions and returning, as the answer data, one or more representative media items associated with the concept in the teacher knowledge graph accessible to the teacher agent; and use the answer data to generate a neuro-symbolic metamodel that comprises a semantic reasoner and a plurality of layers ranging from a sub-symbolic layer to a symbolic layer, wherein using the answer data to generate the neuro-symbolic metamodel comprises populating a metamodel knowledge graph that represents cross-layer mappings as relations between nodes of the sub-symbolic layer corresponding to learned features and nodes of the symbolic layer corresponding to concepts, wherein the semantic reasoner operates on the symbolic layer using the relations.

14. The apparatus as in claim 13, wherein the student agent uses natural language processing to identify the topic of interest.

15. The apparatus as in claim 13, wherein the relations in the metamodel knowledge graph include symmetric and anti-symmetric relations and link the sub-symbolic layer to the symbolic layer.

16. The apparatus as in claim 13, wherein the apparatus uses the answer data to generate the neuro-symbolic metamodel by:

performing, by the student agent, semantic segmentation and object detection on at least one of the one or more representative media items to identify regions and objects represented in the at least one representative media item.

17. The apparatus as in claim 13, wherein the one or more representative media items associated with the concept are based on results from a search engine.

18. The apparatus as in claim 13, wherein the topic of interest comprises a particular type of action associated with a particular type of object.

19. The apparatus as in claim 13, wherein the apparatus uses the answer data to generate the neuro-symbolic metamodel by:

training a neural network at the sub-symbolic layer of the neuro-symbolic metamodel using the answer data, wherein the neural network is configured to output the learned features.

20. A tangible, non-transitory, computer-readable medium storing program instructions that cause a device to execute a process comprising:

identifying, by a student agent that is a first reasoning system metamodel agent, a topic of interest;

issuing, by the student agent, a set of one or more questions to a teacher agent regarding the topic of interest, wherein the teacher agent is a second reasoning system metamodel agent;

receiving, at the student agent and from the teacher agent, answer data in response to the set of one or more questions, wherein the answer data is obtained by the teacher agent searching a teacher knowledge graph accessible to the teacher agent for a concept identified in a respective question of the set of one or more questions and returning, as the answer data, one or more representative media items associated with the concept in the teacher knowledge graph accessible to the teacher agent; and using, by the student agent, the answer data to generate a neuro-symbolic metamodel that comprises a semantic reasoner and a plurality of layers ranging from a sub-symbolic layer to a symbolic layer, wherein using the answer data to generate the neuro-symbolic metamodel comprises populating a metamodel knowledge graph that represents cross-layer mappings as relations between nodes of the sub-symbolic layer corresponding to learned features and nodes of the symbolic layer corresponding to concepts, wherein the semantic reasoner operates on the symbolic layer using the relations.

* * * * *